United States Patent
Kato et al.

(10) Patent No.: US 7,187,636 B2
(45) Date of Patent: Mar. 6, 2007

(54) METHOD AND APPARATUS FOR CORRECTING TILT OF LIGHT BEAM TO OPTICAL RECORDING MEDIUM

(75) Inventors: Masahiro Kato, Tokorozawa (JP); Tatsuhiro Yone, Tokorozawa (JP); Shigeru Yoshida, Tokorozawa (JP); Kanji Ishihara, Tokorozawa (JP)

(73) Assignee: Pioneer Corporation, Tokyo-To (JP)

(*) Notice: Subject to any disclaimer, the term of this patent is extended or adjusted under 35 U.S.C. 154(b) by 317 days.

(21) Appl. No.: 10/651,454

(22) Filed: Aug. 29, 2003

(65) Prior Publication Data

US 2004/0042356 A1   Mar. 4, 2004

(30) Foreign Application Priority Data

Aug. 30, 2002   (JP) ............... P2002-253589

(51) Int. Cl.
*G11B 20/20* (2006.01)
(52) U.S. Cl. .............. 369/53.19; 369/44.32; 369/53.24
(58) Field of Classification Search ............ None
See application file for complete search history.

(56) References Cited

U.S. PATENT DOCUMENTS

| | | | |
|---|---|---|---|
| 6,430,130 B1 * | 8/2002 | Furukawa | 369/53.19 |
| 6,526,007 B1 * | 2/2003 | Fujita | 369/44.32 |
| 6,545,972 B1 * | 4/2003 | Kato et al. | 369/124.12 |
| 6,690,632 B1 * | 2/2004 | Sato et al. | 369/53.19 |
| 2002/0067672 A1 * | 6/2002 | Yanagawa et al. | 369/53.19 |
| 2002/0114237 A1 * | 8/2002 | Kunimatsu | 369/47.55 |
| 2004/0037195 A1 * | 2/2004 | Sasaki et al. | 369/53.19 |

FOREIGN PATENT DOCUMENTS

| | | |
|---|---|---|
| EP | 1 039 453 A1 | 9/2000 |
| EP | 1 213 712 A2 | 6/2002 |
| GB | 2 347 552 A | 9/2000 |
| JP | 2002288859 A * | 10/2002 |

* cited by examiner

*Primary Examiner*—William Korzuch
*Assistant Examiner*—Tawfik Goma
(74) *Attorney, Agent, or Firm*—Ladas & Parry LLP

(57) ABSTRACT

A tilt of a light beam to be radiated onto an information recording disk is corrected without using a dedicated tilt sensor. The correction is performed based on the characteristic that an offset amount between a tilt amount maximizing an RF signal amplitude and a further tilt amount maximizing an LPP signal amplitude is constant and independent of positions on the same disk. A pre-pit signal indicative of an existence/nonexistence of a pre-pit formed on the disk is produced from returned light of the light beam, while an RF signal is produced from bits of information recorded on the disk on the basis of the returned light. An optimum tilt-correcting amount is decided by making use of a relationship between the pre-pit signal and the RF signal at a particular tilt amount. The tilt amount is corrected using the optimum tilt-correcting amount.

8 Claims, 15 Drawing Sheets

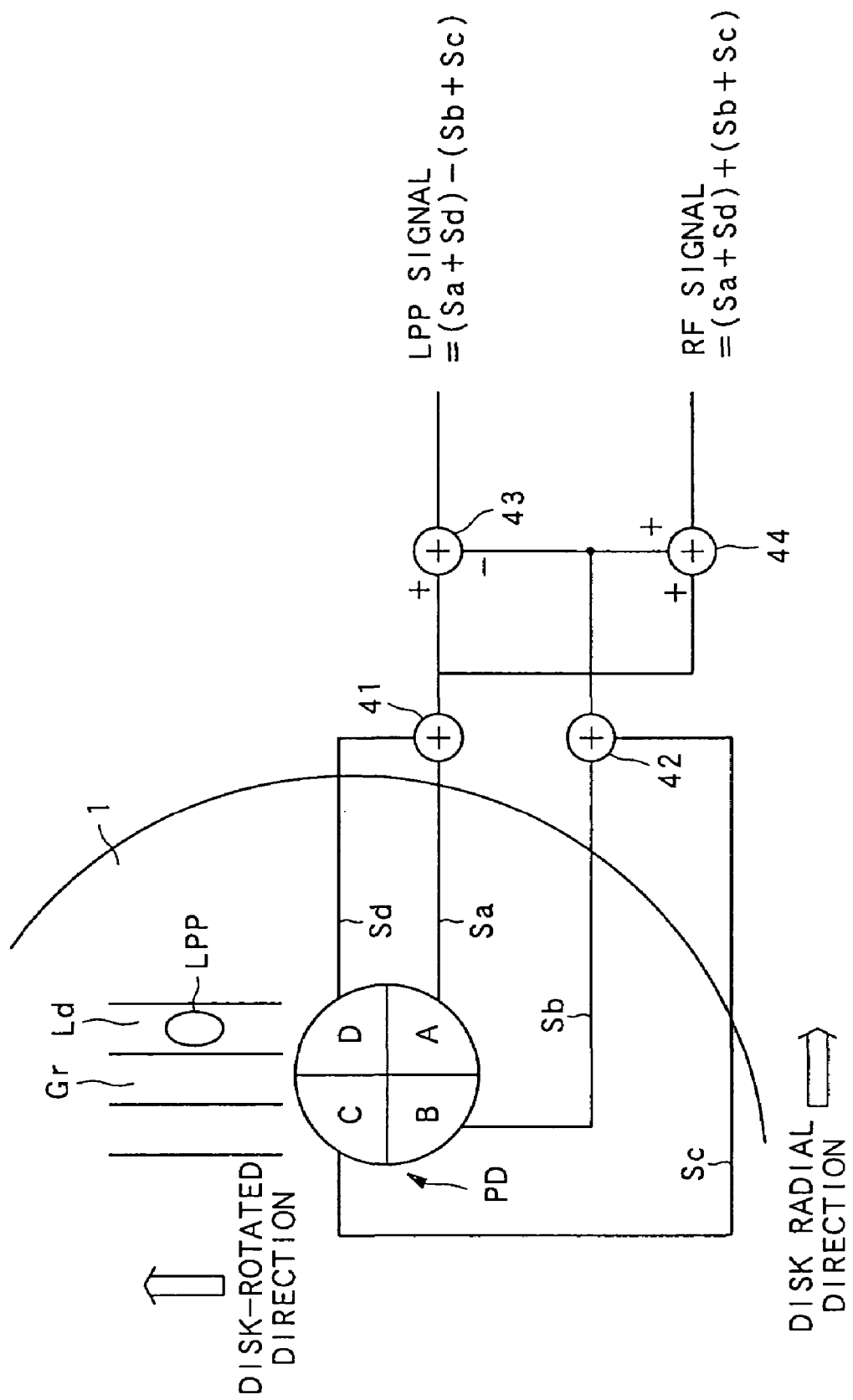

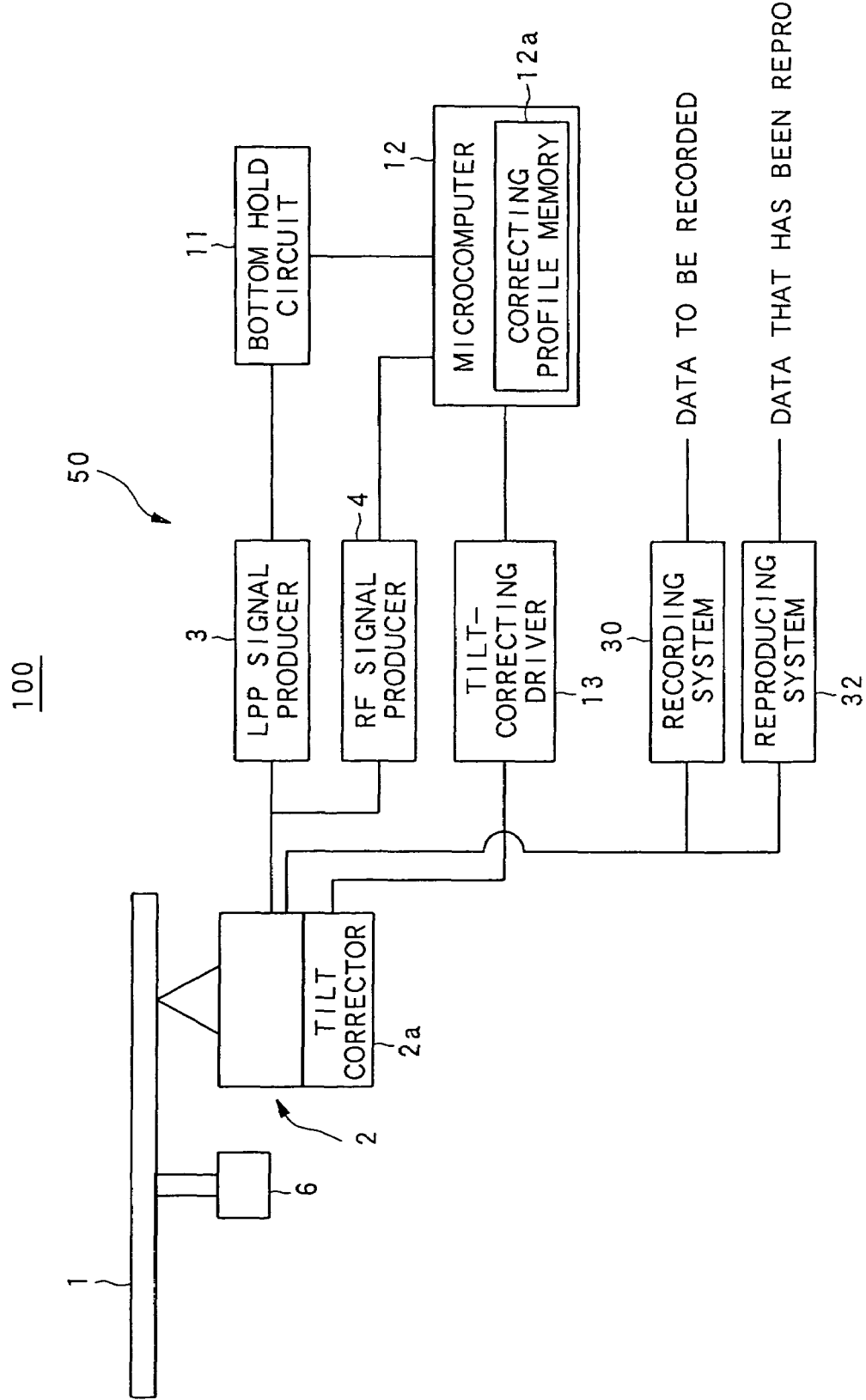

METHOD AND APPARATUS FOR CORRECTING TILT OF LIGHT BEAM TO OPTICAL RECORDING MEDIUM

BACKGROUND OF THE INVENTION

1. Field of the Invention

The present invention relates to a method and apparatus for correcting the tilt of a light beam to optical recording mediums such as optical disks.

2. Description of the Related Art

In general, in recording and reproducing bits of information onto and from an optical disk, a tilt correcting technique has been adopted. The tilt correction is to correct a tilt of an optical beam (also known as "radial tilt") to the information recording surface of an optical disk. Thus, when the tilt is corrected exactly, the optical beam should be radiated at right angles onto the information recording surface of an optical disk.

A conventional detection of the radial tilt has been carried out using a dedicated tilt sensor. Such a dedicated tilt sensor is configured to have an optical source to radiate a light beam dedicated for the radial tilt detection toward the information recording surface of an optical disk and a detector to receive reflected light from the optical disk for detection of an amount of the radial tilt.

One problem arising when using such a dedicated tilt sensor is that the sensor itself is larger in the physical size, thus making a pickup device equipped with the sensor larger in the size. Hence, a slim disk drive, which is often mounted in notebook-size personal computers, has faced this problem. That is, it is impossible for the slim disk drive to have such a tilt sensor mounted therein.

SUMMARY OF THE INVENTION

The present invention has been made with due consideration to the foregoing drawbacks, and an object of the present invention is to provide a tilt correcting apparatus capable of correcting a tilt of an optical recording medium without using the dedicated tilt sensor, whereby the tilt correcting apparatus is avoided from becoming larger in the physical size.

In order to accomplish the foregoing object, as one aspect of the present invention, there is provided a tilt correcting apparatus for correcting a tilt amount of a light beam to be radiated from a pickup to a disk, the apparatus comprising: a pre-pit signal producer configured to produce a pre-pit signal indicative of an existence/nonexistence of a pre-pit formed on the disk on the basis of returned light of the light beam radiated onto the disk; an RF signal producer configured to produced an RF signal from bits of information recorded on the disk on the basis of the returned light; a correcting-amount deciding unit configured to decide an optimum tilt-correcting amount by making use of a relationship between the pre-pit signal and the RF signal; and a tilt corrector configured to correct the tilt amount on the basis of the optimum tilt-correcting amount.

According to another aspect of the present invention, there is provided a tilt correcting method of correcting a tilt amount of a light beam to be radiated from a pickup to a disk, the method comprising the steps of: producing a pre-pit signal indicative of an existence/nonexistence of a pre-pit formed on the disk on the basis of returned light of the light beam radiated onto the disk; producing an RF signal from bits of information recorded on the disk on the basis of the returned light; deciding an optimum tilt-correcting amount by making use of a relationship between the pre-pit signal and the RF signal; and correcting the tilt amount on the basis of the optimum tilt-correcting amount

BRIEF DESCRIPTION OF THE DRAWINGS

Other objects and aspects of the present invention will become apparent from the following description and embodiments with reference to the accompanying drawings in which:

FIG. 1 illustrates both of the position of a land pre-pit on a disk and how to produce an LPP signal and an RF signal;

FIG. 4 is a block diagram showing an outlined configuration of an information recording/reproducing system according to an example of the present embodiment;

DETAILED DESCRIPTION OF PREFERRED EMBODIMENTS

Figure 2A:
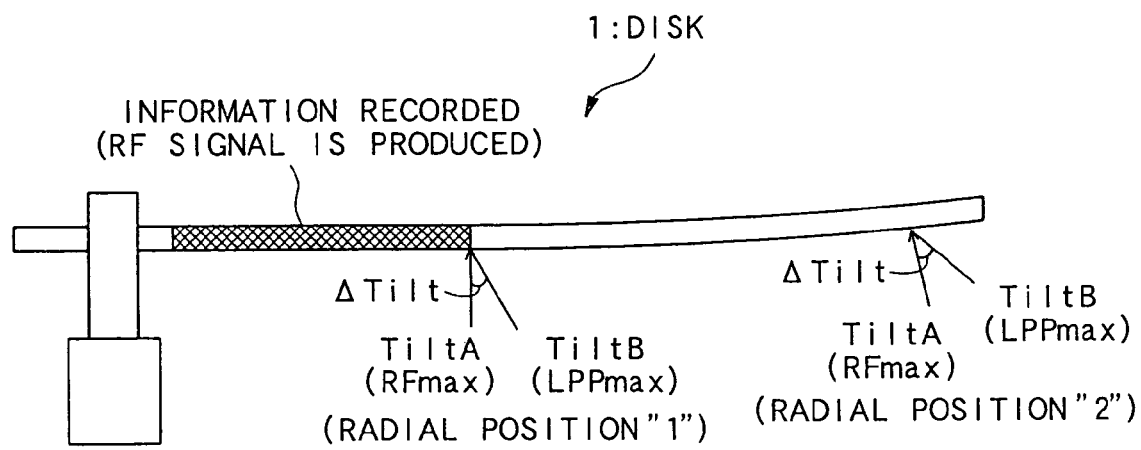
FIG. 2A is a view explaining radial tilts at different radial positions on a disk.

Refereeing to the accompanying drawings, a preferred embodiment of the present invention will now be described.

In the following embodiment, tilt correction is directed to an optical disk with pre-pits formed thereon, such as DVD-R (Digital Versatile Disc-Recordable) and DVD-RW (DVD-Rewritable) and, from the fact that there are correlations of amplitude levels of a pre-pit signal and an RF (Radio Frequency) signal to amounts of the radial tilt, both the pre-pit signal and RF signal are utilized for performing the tilt correction.

FIG. 1 pictorially shows a relationship between a disk with pre-pits formed thereon and a pre-pit signal produced from the pre-pits. A disk 1 is, for example, a DVD-R or DVD-RW and has an information recording surface. On the recording surface, a groove Gr and a land Ld are formed alternately so as to trace a spiral form, respectively. The groove Gr functions as a recording track along which bits of information are recorded. The land Ld is formed between neighboring grooves Gr. On the land Ld, land pre-pits (hereafter referred to as "LPPs") are formed on a predetermined rule. The land pre-pits LPPs are formed to have bits of address information on the disk 1. More specifically, any groove Gr is given bits of various types of information including address information and such information is recorded at the LPPs formed on the land Ld adjacent to the groove Gr in the radially outward direction.

The LPPs can be detected by a quadrant photo detector PD shown in FIG. 1. The quadrant photo detector PD has four detection surfaces A to D, each of which receives the light reflected from the disk 1 and applies photo-electric conversion to the received light to output a detection signal Sa (to Sd). The detection signals Sa to Sd from the detection surfaces A to D are sent the three adders 41 to 43 to produce an LPP signal, which is given by the following expression:

$$LPP\ \text{signal} = (Sa+Sd) - (Sb+Sc) \quad (1)$$

The quadrant photo detector PD is mounted to a pickup of an information recording system or information reproducing system. In a condition where a tracking servo mechanism of the information recording system or information reproducing system controls the quadrant photo detector PD so that the boundary between one pair of the detection surfaces A and D and the other pair of the detection surfaces B and C traces the center of each recording track (i.e., each groove) Gr, the detection signal Sa to Sd are subjected to the calculation on the foregoing expression (1). Hence the LPP signal is obtained, which provides a pre-pit signal showing the presence of the LPPs.

When paying attention to any one recording track Gr, the LPPs reside on the radially inner and radially outer lands Ld both adjacent to the recoding track Gr. In cases where each recording track Gr is tracked, the LPPs reside on the radially outer land Ld are detected through the expression (1) as a negative detection signal, while the reside on the radially inner land Ld are detected through the expression (1) as a positive detection signal.

Meanwhile, the RF signal is a signal reproduced based on information recorded on the disk 1. In other words, the RF signal is obtained responsively to whether or not there are formed recording pits (recording marks) on the disk 1 and, as shown in FIG. 1, is obtained by the following expression (2):

$$RF\ \text{signal} = (Sa+Sd) + (Sb+Sc) \quad (2).$$

As understood from the foregoing expression (1), the LPP signal is calculated as a push-pull signal in the radial direction of the quadrant photo detector PD (known as a radial push-pull signal). On the other hand, as clear from the expression (2), the RF signal is calculated as a sum of the detection signals Sa to Sd coming from the four detection surfaces A to D. Accordingly, it has been known that there is a theoretical correlation between an incident angle of a light beam radiated from the pickup to the recording surface of a disk and amplitude levels of the LPP signal and RF signal. In other words, the larger an amount of the radial tilt (i.e., an angular difference of the incident beam from right angles to the recording surface of the disk), the smaller amplitude levels of both the LPP and RF signals, while the smaller the amount of the radial tilt, the higher the amplitude levels of both the LPP and RF signals.

However, it has also been known that there is not always a consistency between an amount of tilt providing a maximum to amplitude levels of the LPP signal and a further amount of tilt providing a maximum to amplitude levels of the RF signal. In general, there is an offset (noted as "ΔTilt") between both the maximums. In addition, it has been known that the offset ΔTilt is nearly constant independently of the positions on a single disk.

Figure 2B:
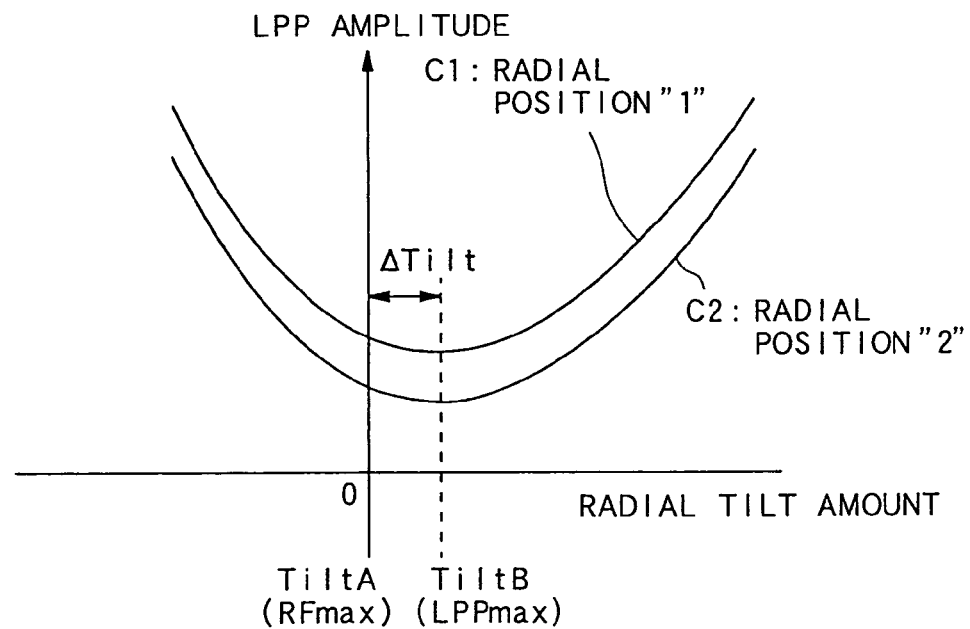
FIG. 2B is a graph showing the relationship between a radial tilt amount on the disk and the amplitude of an LPP signal detected at different radial positions, the graph being illustrated in consideration of an RF signal.

Referring to FIGS. 2A and 2B, the nature of the almost-constant offset ΔTilt will now be described in more detail. FIG. 2A illustrates, by way of example, part of a section of one disk 1 of which radially-outer end is slightly bent upward. When measured at a radial position "1" located on the disk flat region, an amount of tilt that maximizes the amplitudes of the RF signal is a "Tilt A" and a further amount of tilt that maximizes the amplitudes of the LPP signal is a "Tilt B." However, when the measurement point is moved to anther radial position "2" located on the radially-outer end that is bent slightly, the tilt amount "Tilt A" that maximizes the amplitudes of the RF signal is different from that at the radial position "1" by an amount corresponding to the bent amount of the end thereof. Similarly, the tilt amount "Tilt B" that maximizes the amplitudes of the LPP signal is different from that at the radial position "1." However, even at the radial position "2," the offset ΔTilt, which is a difference between the tilt amount "Tilt A" maximizing the RF signal amplitudes and the tilt amount "Tilt B" maximizing the LPP signal amplitude, is still kept the same amount as that at the radial position "1."

This inherent characteristic is shown by FIG. 2B, where two characteristics C1 and C2 are graphed. One characteristic C1, which is obtained by measurement at the radial position "1," shows the relationship between the tilt amounts and the LPP signal amplitudes, whilst the other characteristic C2, which is obtained by measurement at the radial position "2," shows the relationship between the tilt amounts and the LPP signal amplitudes. Incidentally, in FIG. 2B, the characteristic C1 and C2 are depicted on condition that an amount of tilt that gives rise to a maximum in the RF signal amplitudes (that is, "Tilt A") is "zero." As understood from FIG. 2B, the radial positions "1" and "2" exhibit different LPP amplitudes at the same tilt amount. This is attributable to differences in groove shapes, fluctuations in the substrate, fluctuations in the thickness of a recording membrane, and others. However, concerning each of the radial positions "1" and "2," the tilt amount "Tilt B" maximizing the LPP signal amplitude is offset by the same amount ΔTilt from the tilt amount "Tilt A" maximizing the RF signal amplitudes. Namely, even if the disk is formed into a partly sagged or bent shape, there is always the same amount of offset ΔTilt between the tilt amount "Tilt A" maximizing the RF signal amplitudes and the tilt amount "Tilt B" maximizing the LPP signal amplitudes, independently of the radial positions on the disk 1.

In general, in recording and reproducing bits of information onto or from a disk, the tilt can be corrected so that the amplitude of an RF signal is maximized. However, the disk is a non-recording disks on which bits of information has yet to be recorded thereon, it is impossible to gain an RF signal because there is no information to be reproduced. In the case of such a non-recording disk, the amplitude level of the LPP signal is utilized to perform the tilt correction. As stated above, since there is a constant offset ΔTilt between the tilt amounts "Tilt A" and the further tilt amount "Tilt B," the tilt of the non-recording disk can be corrected based on the amplitude levels of the LPP signal and the offset ΔTilt.

Figure 3:
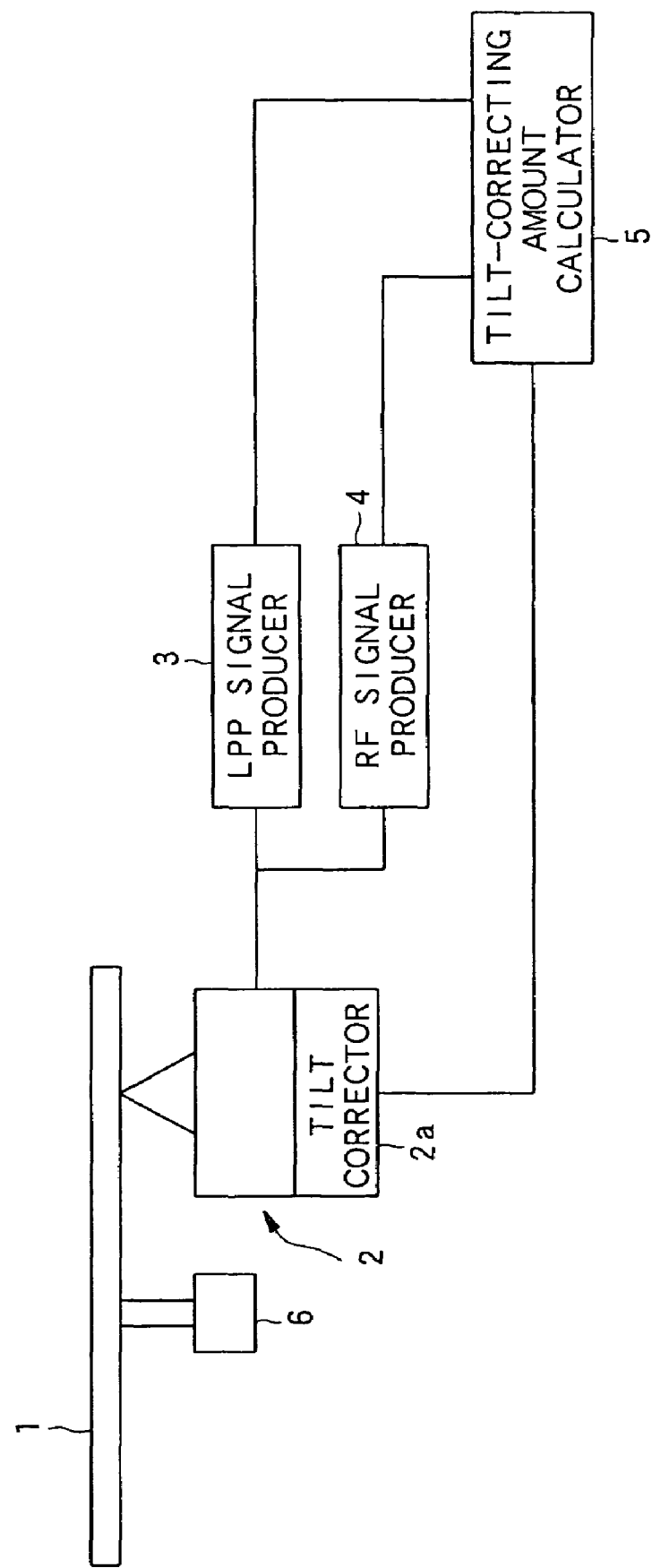
FIG. 3 is a block diagram outlining the configuration of a tilt correcting apparatus according to the present embodiment of the present invention.

In the present embodiment, the tilt correction is carried out on the basis of the relationship that there is the same amount of offset ΔTilt, regardless of the positions on a disk, between the tilt amount "Tilt A" maximizing the RF signal amplitudes and the further tilt amount "Tilt B" maximizing the LPP signal amplitudes. FIG. 3 outlines a system in which the configuration of a tilt correcting apparatus is schematically shown.

In the system shown in FIG. 3, a disk 1 is rotated at a given linear velocity by a spindle motor 6. The tilt correction unit is placed in association with the disk 1. The tilt correction unit is provided with a pickup 2 to not only radiate a light beam onto the disk 1 for recording and reproduction but also receive returned light of the radiated light beam. The pickup 2 includes the quadrant photo detector PD shown in FIG. 1 so as to allow the detector PD to detect the detection signals Sa to Sd at its detection surfaces A to D, so that the pickup 2 supplies the detection signals Sa to Sd toward both of an LPP signal producer 3 and an RF signal producer 4.

The LPP signal producer 3 receives the detection signals Sa to Sd from the pickup 2 and then produces an LPP signal through the calculation based on the foregoing expression (1), the LPP signal being sent to a tilt-correcting amount calculator 5. On the other hand, like the above, the RF signal producer 4 receives the detection signals Sa to Sd and then produces an RF signal by performing calculation based on the foregoing expression (2). The calculated RF signal is given to the tilt-correcting amount calculator 5.

By making use of the foregoing correlation between a tilt amount that maximizes the amplitudes of the RF signal and another tilt amount that maximizes the amplitudes of the LPP signal, the tilt-correcting amount calculator 5 decides an optimum tilt-correcting amount, which is required to make the radial tilt amount "zero." The tilt-correcting amount calculator 5 then supplies the decided optimum tilt-correcting amount to a tilt corrector 2a mounted to the pickup.

The tilt corrector 2a operates based on the supplied optimum tilt-correcting amount in such a manner that the radiating direction of the optical beam is adjusted to accomplish the tilt correction. Hence the RF signal and/or the LPP signal can be used to carry out detection of an amount of the radial tilt and correction of the radial tilt.

EXAMPLE

A preferred example of the above embodiment will now be explained.

(Information Recording/Reproducing System)

FIG. 4 is a block diagram outlining the configuration of an information recording/reproducing system according to an example realized based on the foregoing embodiment.

As shown in FIG. 4, the disk 1 is subjected to the control for CLV (Constant Linear Velocity), which is carried out by the spindle motor 6, so that the disk 1 is rotated at a constant velocity. In the configuration of FIG. 4, there is provided an information recording/reproducing system 100, which is provided with, from a roughly-sectioned point of view, a recording system 30 configured to record recording data onto the disk 1, a reproducing system 32 configured to reproduce data recorded on the disk 1, and a tilt correcting apparatus 50 configured to correct the radial tilt to the disk 1. Of these components, both of the recording and reproducing systems 30 and 32 can be configured with the known constituents, so that they are omitted from being explained in detail, The tilt correcting apparatus 50 is equipped with a pickup 2, LPP signal producer 3, RF signal producer 4, bottom hold circuit 11, microcomputer 12, tilt-correcting driver 13, tilt corrector 2a incorporated in the pickup 2. The tilt corrector 2a can be constructed by using different tilt correcting mechanisms, such as a mechanism for mechanically adjusting a light beam axis to be radiated onto the disk 1; a device constructed using a liquid crystal element to adjust a light beam axis; or a actuator to adjust a light beam axis. The microcomputer 12 includes a correcting profile memory 12a.

(Tilt Correcting Apparatus)

The operations of the tilt correcting apparatus 50 will now be explained. The pickup 2 supplies detection signals Sa to Sd to both of the LPP signal producer 3 and the RF signal producer 4, the detection signals Sa to Sd being detected at the detection surfaces A to D of the quadrant photo detector PD, as shown in FIG. 1. The LPP signal producer 3 receives the detection signals Sa to Sd to calculate an LPP signal based on the expression (1), and then supplies the calculated LPP signal to the bottom hold circuit 11. The bottom hold circuit 11 operates to hold a bottom level of the LPP signal, and then provides the held bottom level signal to the microcomputer 12.

The bottom hold circuit 11 is designed such that the circuit 11 performs the bottom level hold in the LPP signal at locations where the LPP signal can be detected with stability. Practically, such positions are (a): an information-nonrecorded region on the disk 1, (b): spaces in an information-recorded region on the disk 1, or (c): spaces existing recorded data under the recording operation onto the disk 1.

Concurrently with the above operation carried out by the LPP signal producer 3, the RF signal producer 4 also receives the detection signals Sa to Sd coming from the pickup 2, then calculates an RF signal based on the foregoing expression (2). The resultant RF signal is supplied to the microcomputer 12.

The microcomputer 12, which receives both the LPP signal coming from the bottom hold circuit 11 and the RF signal coming from the RF signal producer 4, applies the received signals to offset measurement processing to measure an offset ΔTilt described before, correction-profile production processing to produce a correction profile indicative of a tilt correction characteristic of each disk based on the resultant offset amount ΔTilt, and tilt correction processing to correct the radial tilt using the resultant correction profile. The above three types of processing will be described later one by one.

The tilt-correcting driver 13, which is driven for the tilt correction, receives data indicative of a tilt-correcting amount to produce control data for the tilt corrector 2a. The control data is provided to the tilt corrector 2a, so that the tilt corrector 2a is able to correct the radial tilt. The type of control data required by the tilt corrector 2a depends on a correcting mechanism mounted to the tilt corrector 2a. For instance, when the correction mechanism uses liquid crystal, the control data is composed of control voltage data.

(Relationship of RF Amplitude and LPP Amplitude to Tilt Amount)

The two foregoing relationships, that is, one relationship between amplitudes of an RF signal (RF amplitude) and tilt amounts and the other relationship between amplitudes of an LPP signal (LPP amplitude) and tilt amounts, will now be exemplified.

Figure 5A:
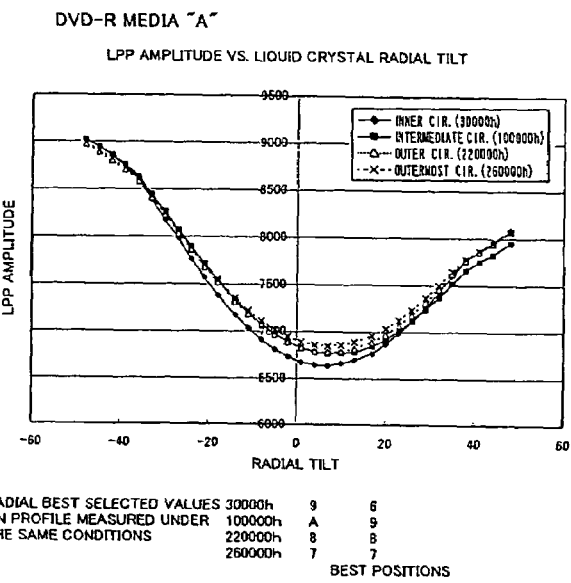
FIGS. 5A to 5C are graphs each showing relationships between a radial tilt amount and an LPP signal amplitude at different radial positions on the same DVD-R disk.
Figure 5B:
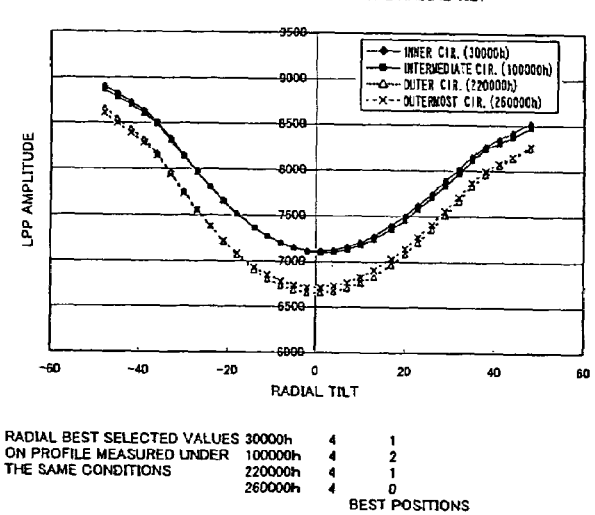
Figure 5C:
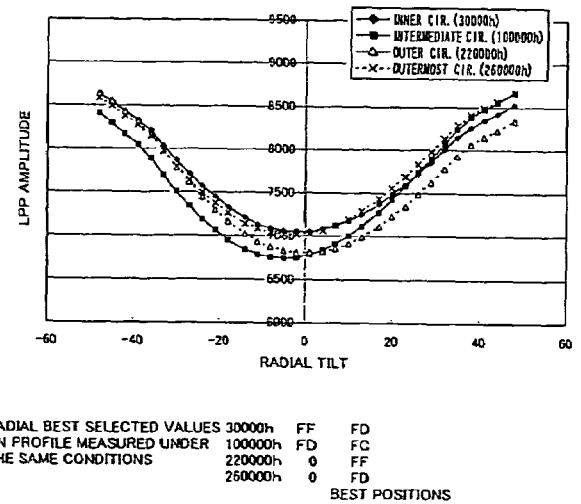
Figure 6A:
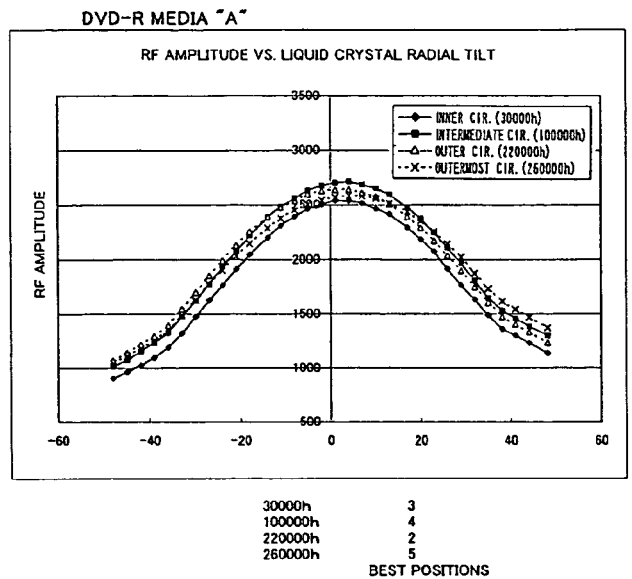
FIGS. 6A to 6C are graphs each showing relationships between the radial tilt amount and an RF signal amplitude at different radial positions on the same DVD-R disk.
Figure 6B:
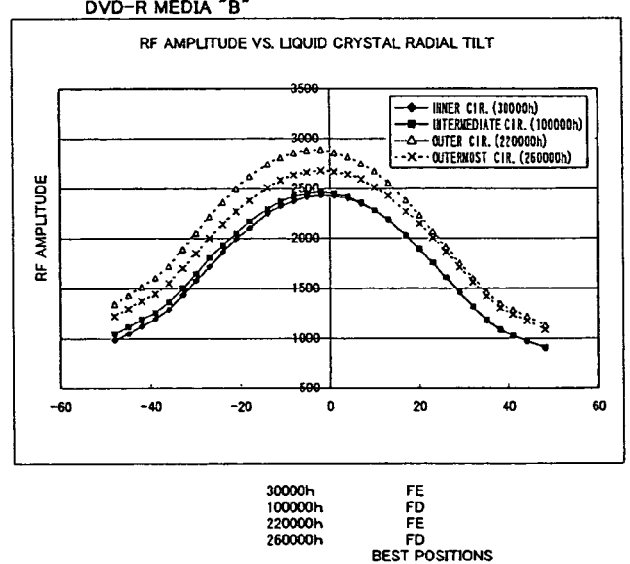
Figure 6C:
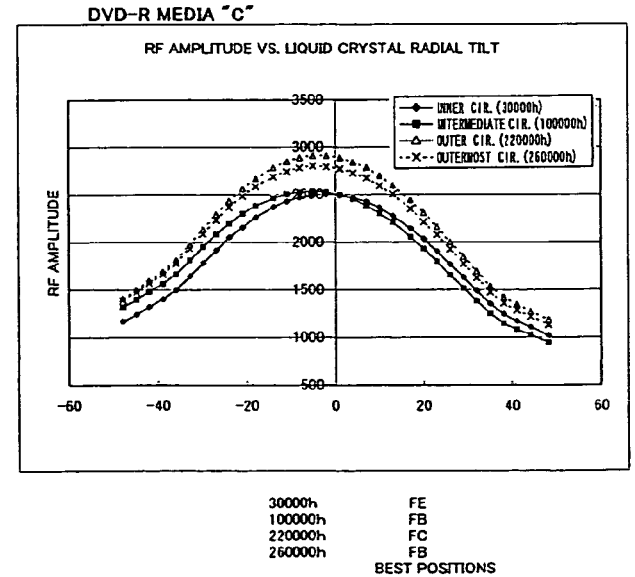

FIGS. 5A to 5C show curves, each (showing four curves) of which represents a relationship between radial tilt amounts and LPP amplitudes, obtained through measurement of three kinds of DVD-R disks "A" to "C." FIGS. 6A to 6C show curves, each (showing four curves) of which represents a relationship between radial tilt amounts and RF amplitudes, obtained through measurement of the foregoing same three kinds of DVD-R disks "A" to "C." Any of the LPP and RF amplitudes were measured, with radial tilt amounts changed little by little, from the disks "A" to "C" with the use of the tilt correcting apparatus that employs a liquid crystal member serving as the tilt correcting mechanism. Incidentally, the amplitudes of the LPP signal are expressed as the negative-polarity signals, thus their absolute values showing amplitude amounts. Further, in FIGS. 5A to 5C and 6A to 6C, the radial tilt amounts on each of the abscissa axes are scaled with tilt amounts to be set to the tilt correcting apparatus, thus being composed of voltage data to be given to the liquid-crystal type of tilt correcting apparatus employed by this example. Still further, each of FIGS. 5A to 5C and 6A to 6C has four curves measured at four radial points on each disk (specifically, each point residing in each of inner, intermediate, outer, and outermost circumferential regions in the radial direction).

As shown in FIGS. 5A to 5C, any of the disks A to C provides a radial tilt amount maximizing the LPP signal amplitude, which is not zero and shifted toward either the positive- or negative-amount direction. The shifted directions and shifted amounts are different disk by disk. Even in the case of the same disk, different radial positions provide different radial tilt amounts respectively maximizing the LPP signal amplitudes which are slightly changed.

Like the above, as shown in FIGS. 6A to 6C, any of the disks A to C provides a radial tilt amount maximizing the RF signal amplitude, which is not zero and shifted toward either the positive- or negative-amount direction. The shifted directions and shifted amounts are different disk by disk. Even in the case of the same disk, different radial positions provide different radial tilt amounts respectively maximizing the RF signal amplitudes which are slightly changed.

Figure 7A:
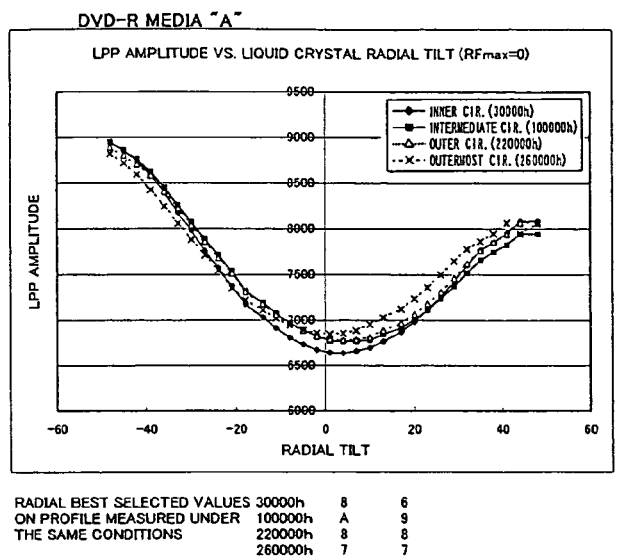
FIGS. 7A to 7C are graphs each showing relationships between the radial tilt amount and the LPP signal amplitude at different radial positions on the same DVD-R disk, wherein a radial tilt amount maximizing the RF signal amplitude is set to zero.
Figure 7B:
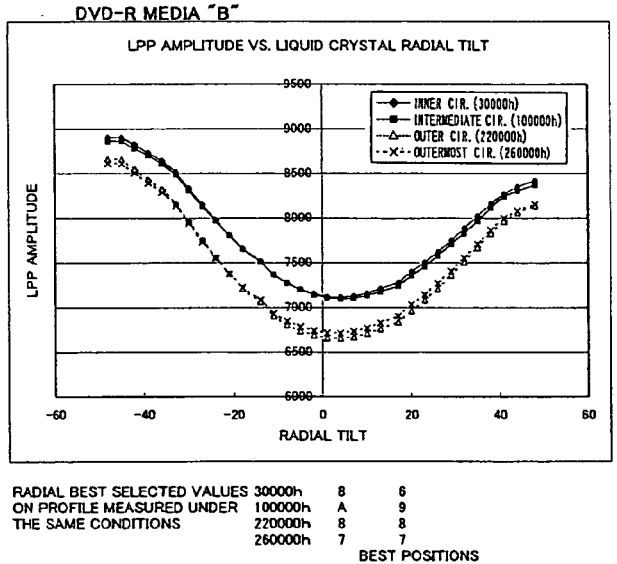
Figure 7C:
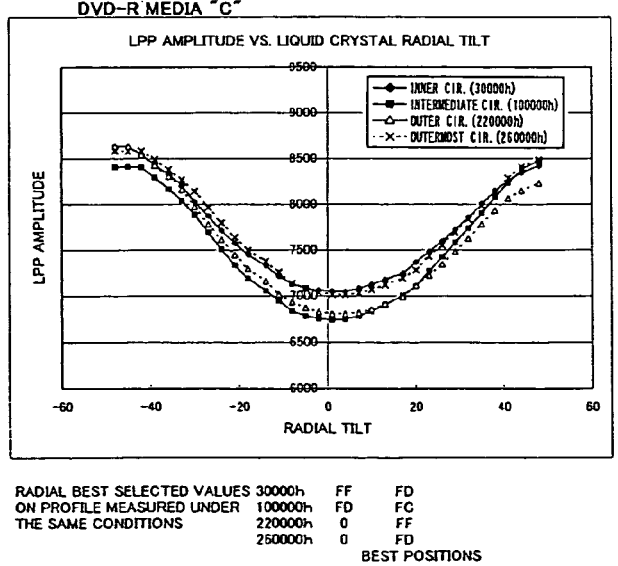

Therefore, radial tilt amounts each maximizing the RF signal amplitude are acquired individually from FIGS. 6A to 6C, and then are handled as being zero (that is, located at the center of the abscissa axis) in order to rewrite the graphs shown in FIGS. 5A to 5C into FIGS. 7A to 7C. FIGS. 7A to 7C reveal that, though being different disk by disk, the radial tilt amounts each maximizing the LPP signal amplitude are always offset by a constant amount from each of the radial tilt amounts maximizing RF signal amplitudes (that is, the positions of a radial tilt "zero" in each of FIGS. 7A to 7C) independently of the radial positions on the dame disk.

The similar measurements to the above were carried out with three-kinds of DVD-RW disks, which were resulted in graphs shown in FIGS. 8A to 8C and FIGS. 9A to 9C. As understood from those graphs, the DVD-RW disks still keep the identical relationship to that explained about the foregoing DVD-R disks.

Figure 8A:
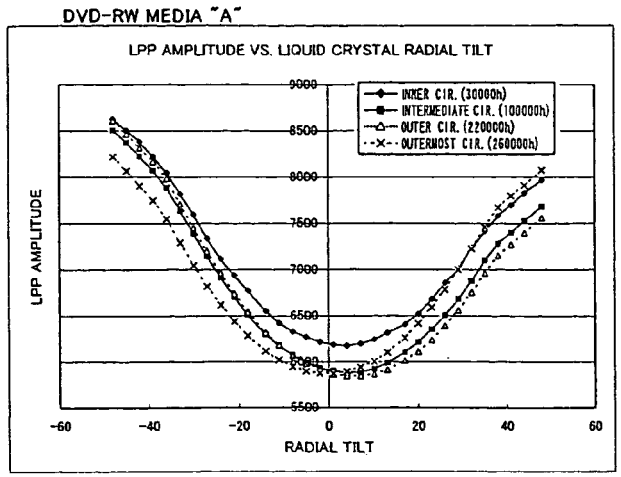
FIGS. 8A to 8C are graphs each showing relationships between a radial tilt amount and an LPP signal amplitude at different radial positions on the same DVD-RW disk.
Figure 8B:
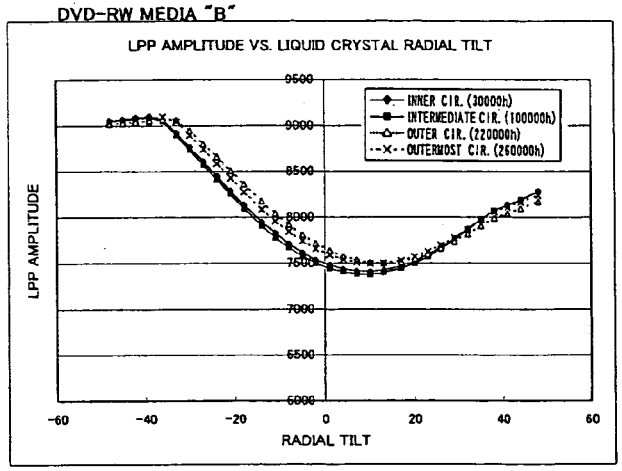
Figure 8C:
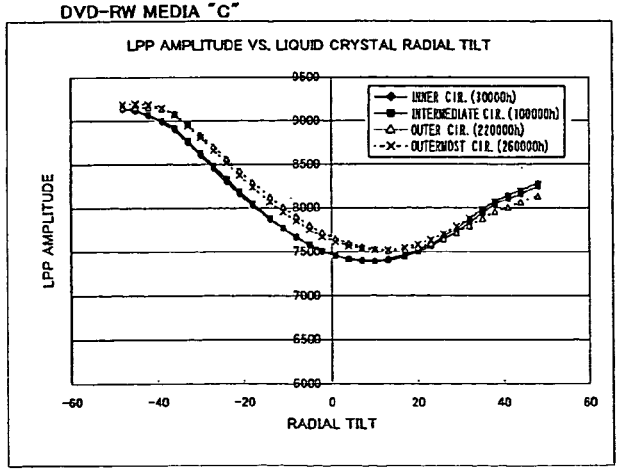

To be specific, as shown in FIGS. 8A to 8C, any of the disks A to C provides a radial tilt amount maximizing the LPP signal amplitude, which is not zero and shifted toward either the positive- or negative-amount direction. The shifted directions and shifted amounts are different disk by disk. Even in the case of the same disk, different radial positions provide different radial tilt amounts each maximizing the LPP signal amplitudes which are slightly changed.

Figure 9A:
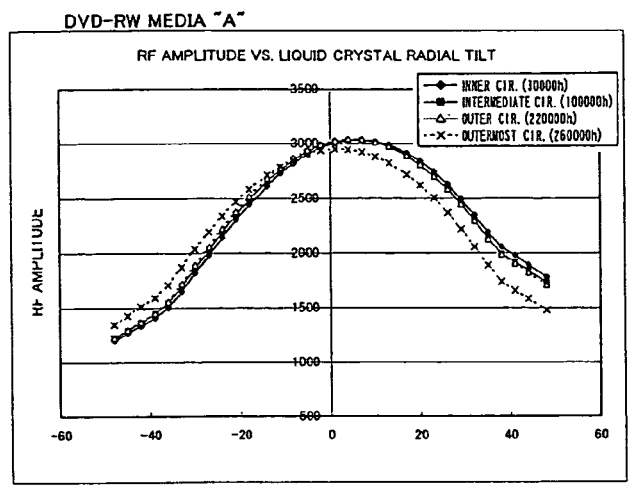
FIGS. 9A to 9C are graphs each showing relationships between the radial tilt amount and an RF signal amplitude at different radial positions on the same DVD-RW disk.
Figure 9B:
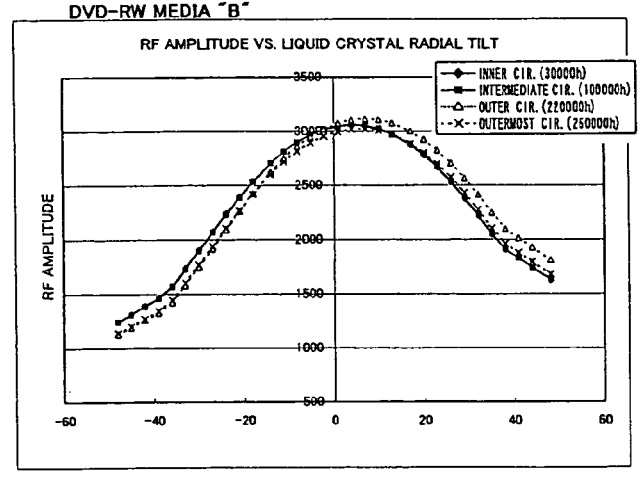
Figure 9C:
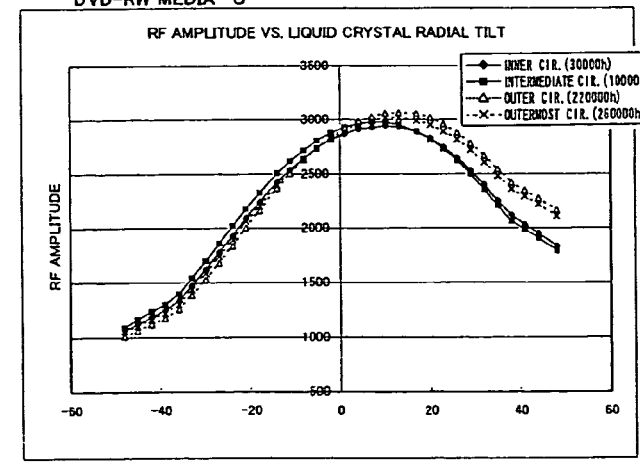

Like the above, as shown in FIGS. 9A to 9C, any of the disks A to C provides a radial tilt amount maximizing the RF signal amplitude, which is not zero and shifted toward either the positive- or negative-amount direction. The shifted directions and shifted amounts are different disk by disk. Even in the case of the same disk, different radial positions provide different radial tilt amounts each maximizing the RF signal amplitudes which are slightly changed.

Figure 10A:
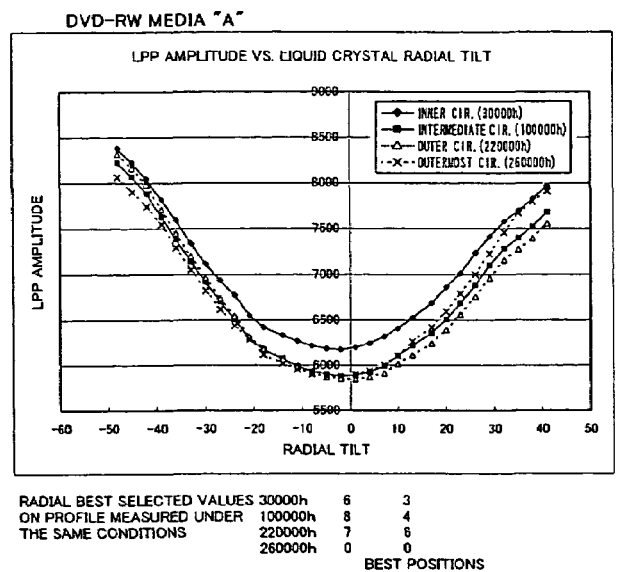
FIGS. 10A to 10C are graphs each showing relationships between the radial tilt amount and the LPP signal amplitude at different radial positions on the same DVD-RW disk, wherein a radial tilt amount maximizing the RF signal amplitude is set to zero.
Figure 10B:
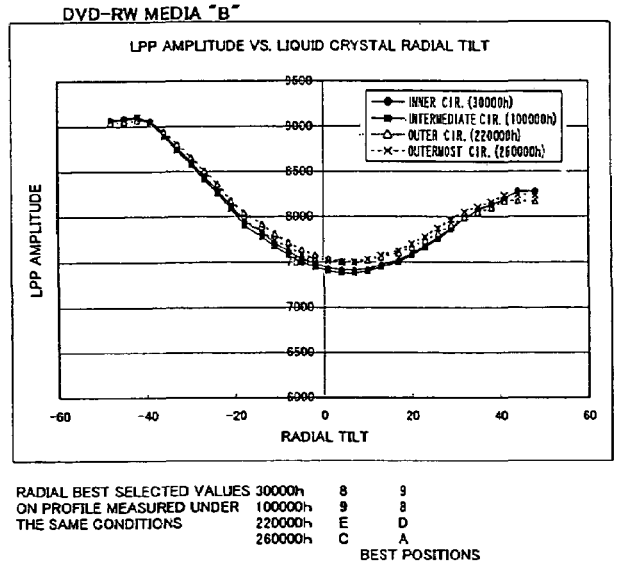
Figure 10C:
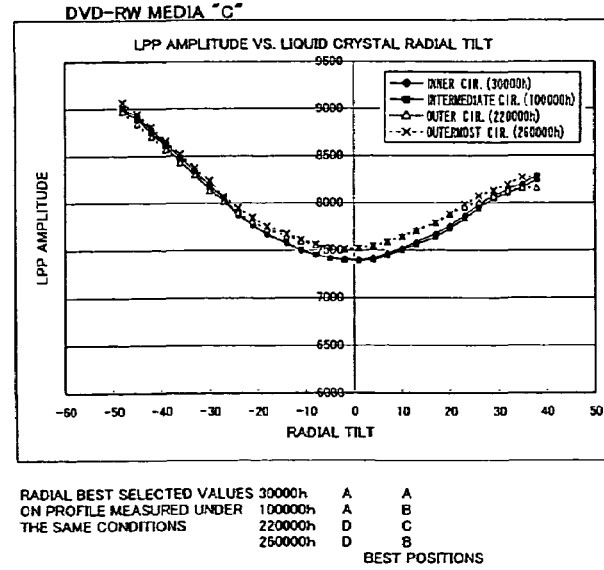

Therefore, radial tilt amounts each maximizing the RF signal amplitude are acquired individually from FIGS. 9A to 9C, and then are handled as being zero to show FIGS. 10A to 10C in which the radial tilt amounts are graphed in association with the LPP signal amplitudes shown in FIGS. 8A to 8C. FIGS. 10A to 10C reveal that, though being different disk by disk, the radial tilt amounts each maximizing the LPP signal amplitude are always offset by a constant amount from each of the radial tilt amounts maximizing RF signal amplitudes (that is, the positions of a radial tilt "zero" in each of FIGS. 10A to 10C) independently of the radial positions on the dame disk.

Hence, in cases where the RF signal is unavailable because the disk is yet to be recorded with bits of information, a radial tilt amount that maximizes the LPP signal amplitude and an offset amount that has been pre-measured can be used to calculate a radial tilt amount that gives a maximum to the RF signal amplitude.

(Tilt Correction)

In the next place, how to correct the radial tilt will now be explained. In principle, the radial tilt is corrected through the performance of the microcomputer 12 that decides a tilt-correcting amount that maximizes the RF signal amplitude and controls the tilt-correcting driver 13 based on the tilt-correcting amount that has been decided. This control enables the correction under the tilt corrector 2a. In a practical point of view, when the information recording/reproducing system 100 is loaded with a disk onto or from which bits of information are recorded or reproduced, the microcomputer 12 produces a correction profile to define tilt-correcting amounts for the disk to preserve the produced correction profile into the correcting profile memory 12a. In recording/reproducing bits of information, the correction profile is referred by the microcomputer 12 to execute the radial tilt correction.

The correction profile is composed of data indicative of the relationship between the radial positions on the disk 1 and optimum tilt-correcting amounts at each of the radial positions. By way of example, such radial positions on each disk can be defined as four positions belonging to each of radial inner, radial intermediate, radial outer, and radial outermost circumferential regions divided appropriately depending on radial distances from the center on the disk (refer to FIG. 15A) and an optimum tilt-correcting amount is assigned to each of the four positions.

Basically, as described before, the optimum tilt-correcting amounts are decided so as to give a maximum to the amplitudes of an RF signal. However, if a disk on which bits of information yet to be recorded is used, it is unable to detect an RF signal at each position on the disk, resulting in that tilt-correcting amounts maximizing the RF signal amplitude cannot be obtained. In this case, therefore, the characteristic that there is a constant offset $\Delta$Tilt between a tilt amount maximizing the RF signal amplitude and another tilt amount maximizing the LPP signal amplitude on the same disk is utilized. That is, for an information-nonrecorded disk, a tilt amount maximizing the LPP signal amplitude is first acquired, and then a further tilt amount maximizing the RF signal amplitude is calculated based on both the acquired tilt amount and the offset ΔTilt, so that an optimum tilt-correcting amount for the information-nonrecorded disk can be determined. This way of setting the optimum tilt-correcting amount makes it possible that even if a disk on which information has yet to be recorded is used, an optimum tilt amount can be decided with ease and a correction profile can be produced.

Figure 11:
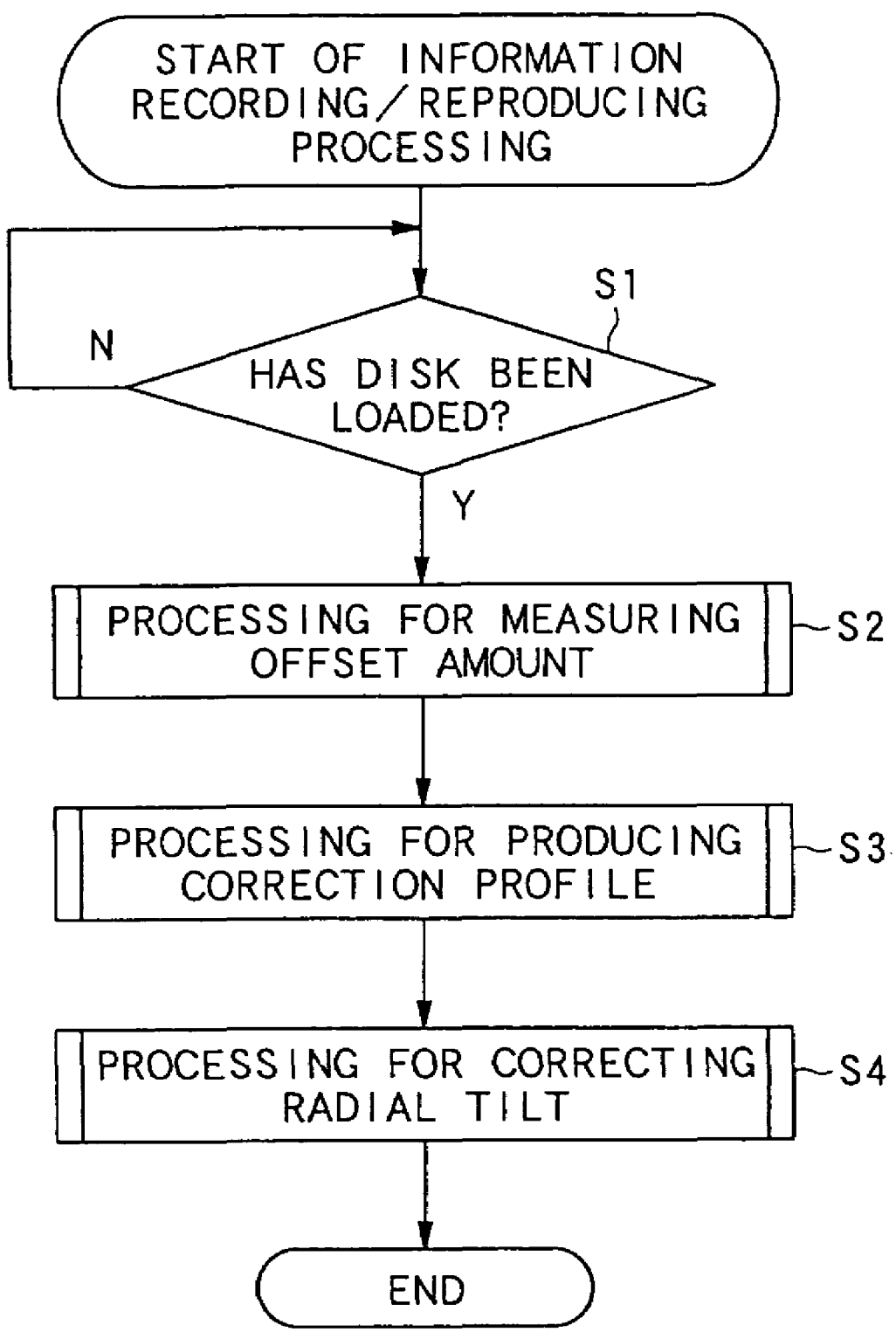
FIG. 11 is a flowchart showing information recording/reproducing processing that includes processing for tilt correction.

Referring to FIG. 11, information recording/reproducing processing that includes processing for the radial tilt correction will now be explained. Writing in addition, each of the following sets of processing is mainly carried out by the microcomputer 12 in the information recording/reproducing system 100 (refer to FIG. 4), the microcomputer 12 being designed to execute previously prepared programs for the various sets of information recording/reproducing processing. In addition, this processing begins to start when a disk is loaded to the information recording/reproducing system 100.

First of all, the microcomputer 12 determines if or not the information recording/reproducing system is loaded with a disk (step S1). The determination that the disk has been loaded is realized when the microcomputer 12 receives a signal from the detection mechanism for the disk.

On completion of loading the disk, the microcomputer 12 proceeds to execution of the processing for offset-amount measurement (step S2).

The offset-amount measurement processing is directed to measurement of the foregoing offset ΔTilt. Concretely, at the boundary position (hereafter also referred to as "RF-signal existence/nonexistence boundary") between a region (information-recorded region) from which an RF signal can be detected and a further region (information-nonrecorded region) from which an RF signal cannot be detected, both of a first tilt amount maximizing an RF signal amplitude and a second tilt amount maximizing an LPP signal amplitude are acquired, and then a difference between the first and second tilt amounts, that is, an offset ΔTilt, is calculated.

In the case of an information-recorded disk, the RF-signal existence/nonexistence boundary is located at a boundary between a information-recorded region and an information-nonrecorded region on a data region on the disk. By contrast, in an information-nonrecorded disk, there is no recorded region in the data region. However, as illustrated in FIG. 15B, a read-in area on the disk includes a control data zone in which data is pre-recorded. Such a zone on a DVD-R disk is called "pre-write zone," while such a zone on a DVD-RW disk is called "embossed zone." Therefore, even if an information-nonrecorded disk is loaded, the boundary of the control data zone can be used as the RF-signal existence/nonexistence boundary" in measuring the offset.

Figure 12:
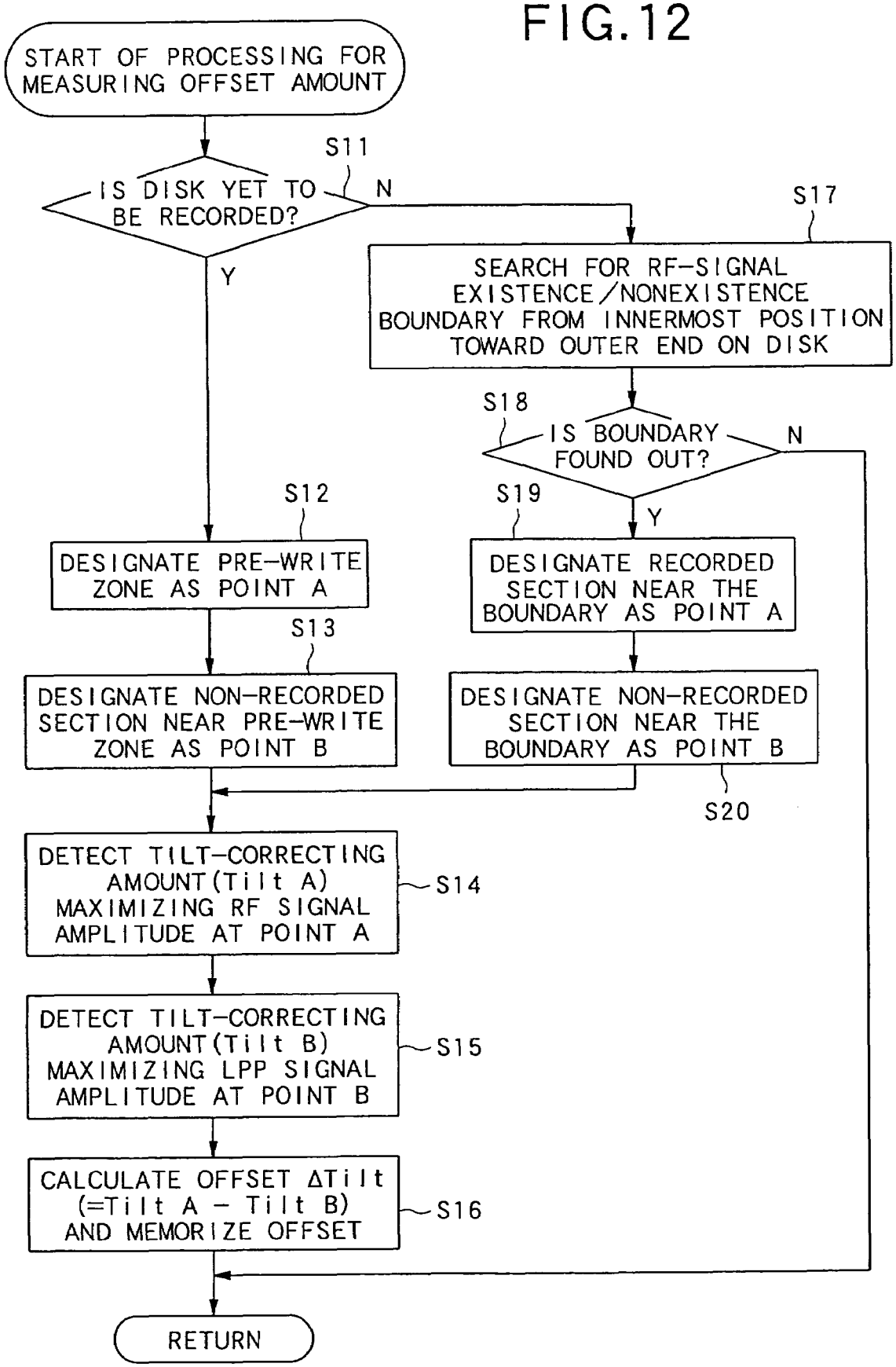
FIG. 12 is a flowchart representing processing for offset measurement.

The offset measurement processing will now be detailed. A flowchart for the processing is shown in FIG. 12. The microcomputer 12 first determines whether or not the disk that has been loaded is an information-nonrecorded disk (step S11). In the case that the loaded disk is a disk has already been subjected to recording of bits of information, management information about data to be recorded is recorded at an area immediately before the control data zone within the read-in area shown in FIG. 15B. In contrast, if the loaded disk has yet to be subjected to information recording, no such management information is recorded thereat. Hence, the microcomputer 12 is able to determine whether or not the loaded disk is an information-nonrecorded disk by confirming whether or not information is recorded in an area located immediately before the control data zone in the read-in area.

Figure 15A:
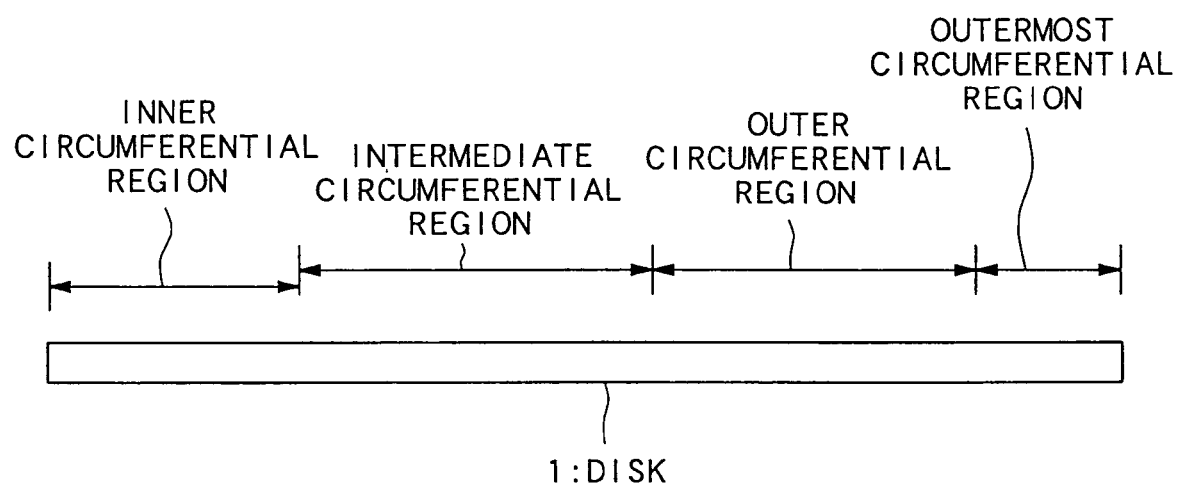
FIG. 15A exemplifies radially-divided regions in each of which a correcting reference position is allocated.
Figure 15B:
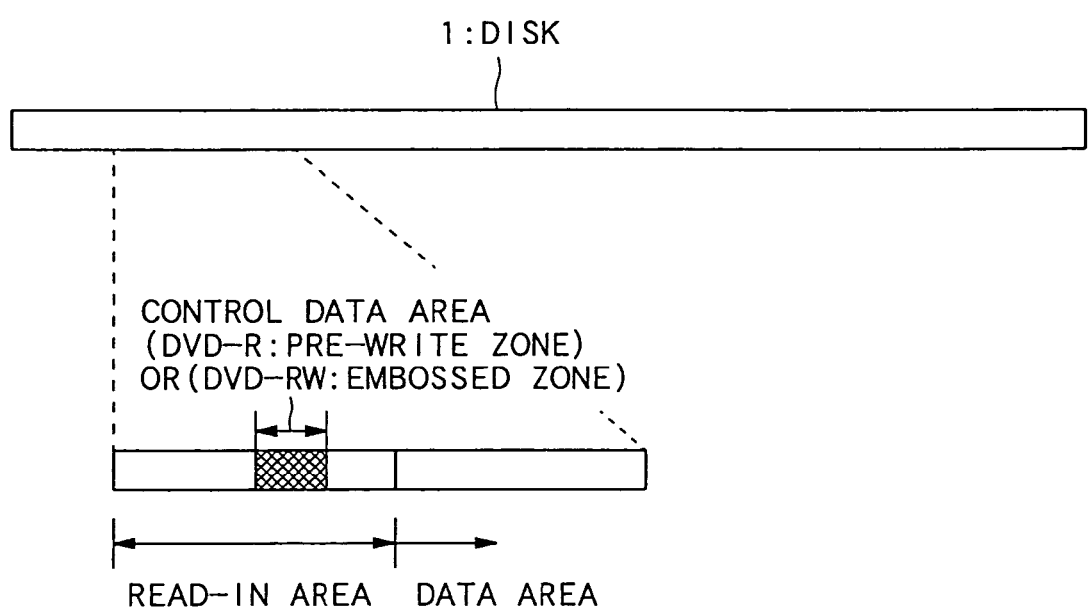
FIG. 15B is a view explaining an information-nonrecorded disk on which there is formed a zone from which an RF signal can be obtained.

When the above determination shows that an information-nonrecorded disk has been loaded, the microcomputer 12 designates a pre-write zone (or embossed zone) shown in FIG. 15A as a point A (step S12). Then the microcomputer 12 designates a non-recorded section near the pre-write zone (or embossed zone) as a point B (step S13). The microcomputer 12 then changes a tilt-correcting amount to various amounts at the data-recorded point A to find out a tilt-correcting amount "Tilt A" that maximizes the RF signal amplitude (step S14). After this, the microcomputer 12 changes a tilt-correcting amount to various amounts at the data-nonrecorded point B to find out a tilt-correcting amount "Tilt B" that maximizes the LPP signal amplitude (step S15). Using the tilt-correcting amounts "Tilt A" and "Tilt B," the microcomputer 12 calculates an offset ΔTilt, before storing the calculated offset ΔTilt into its inner memory or other memories (step S16).

On the other hand, when it has been determined at step S11 that the loaded disk is not an information-nonrecorded disk (that is, loaded is a disk with information already recorded thereon), the microcomputer 12 searches for the RF-signal existence/nonexistence boundary from an innermost position toward the outer end on the disk (step S17). This search is carried out, with tracking servo opened, by moving the slider on with the pickup 2 toward the outer end on the disk and monitoring changes in the RF signal amplitude obtained during the moving operation of the pickup 2. When the search shows the RF-signal existence/nonexistence boundary, the amplitude of the RF signal that has been obtained so far vanishes suddenly. It is therefore possible to recognize such a position as the RF-signal existence/nonexistence boundary.

In response to detection of the RF-signal existence/nonexistence boundary (YES at step S18), a recoded section near to the boundary is designated as the point "A" (step S19), before a non-recorded section near to the recoded section is designated as the point "B" (step S20). The microcomputer 12 then conducts the processing at steps S14 to S16 to calculate an offset ΔTilt.

In cases where it is determined at step S18 that the RF-signal existence/nonexistence boundary has not been detected, it can be recognized that the entire data recording region is filled with data and a correction profile can be produced based on the RF signal amplitude. In such a case, there is no need for measuring the offset ΔTilt. The processing is therefore made to return to the main routine shown in FIG. 11.

The above-mentioned offset measurement processing makes it possible that an offset ΔTilt is obtained, regardless of the disk being an information-recorded disk or an information-nonrecorded disk. Although an information-recorded disk differs in the location of the RF-signal existence/nonexistence boundary from an information-nonrecorded disk, this difference will lead to no problem, because as explained before, the offset ΔTilt is constant on the same disk independently of the radial positions thereon.

Figure 13:
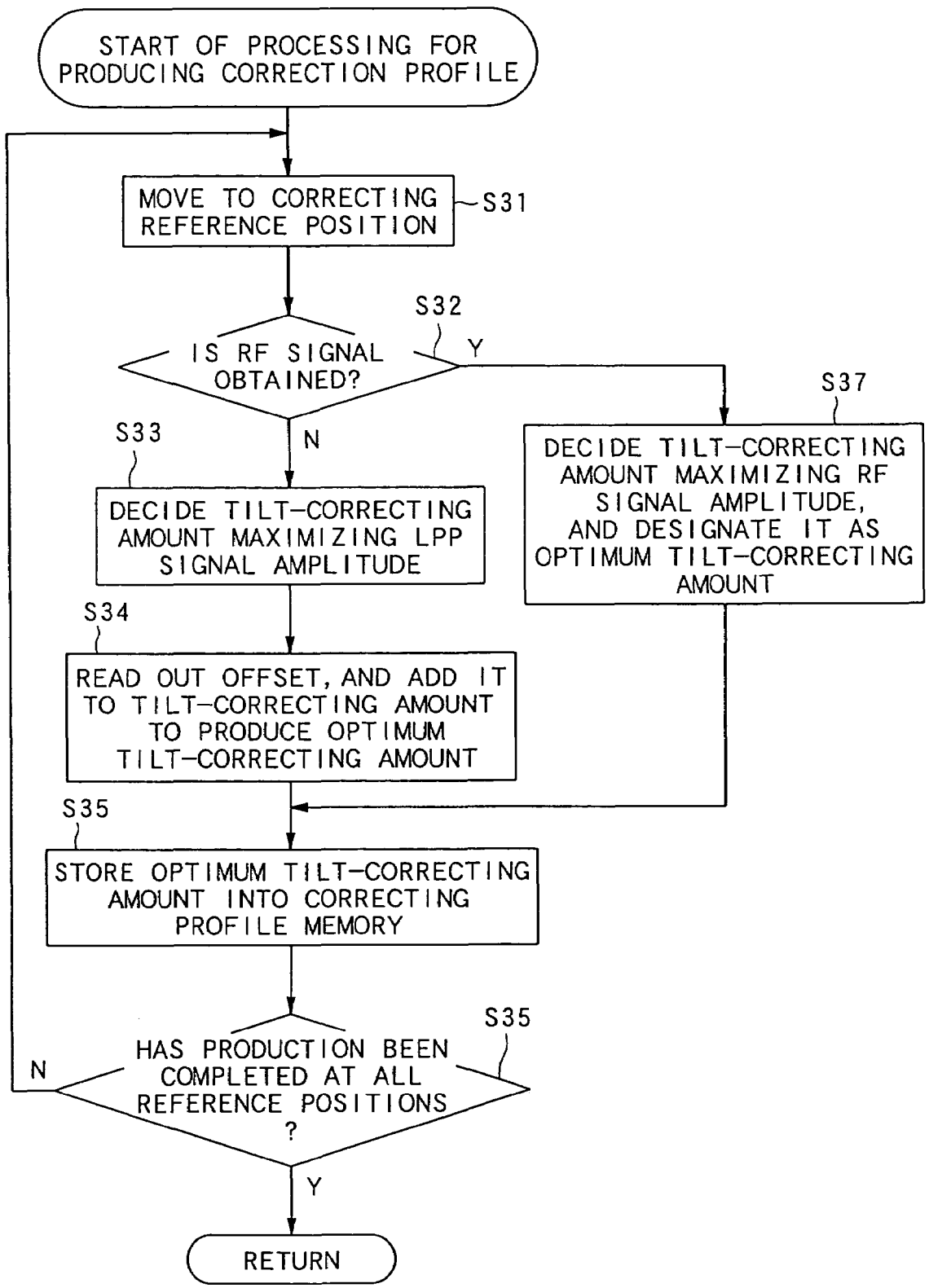
FIG. 13 is a flowchart representing processing for producing a correction profile.

When the offset ΔTilt has been obtained, the processing is made to return to the main routine shown in FIG. 11, where the microcomputer starts production of a correction file (step S3 in FIG. 11). FIG. 13 shows the processing for the production of a correction file.

First, the microcomputer 12 makes the pickup 2 move to a predetermined reference position for the correction on the disk 1 (step S31). The reference position for the correction, which is a position at which the radial tilt correction is performed, is a position belonging to, for example, each of the radial inner, radial intermediate, radial outer, and radial outermost circumferential regions divided appropriately depending on radial distances from the center on the disk 1 (refer to FIG. 15A). Therefore, for the first time, the reference position for the correction is set to a position residing in the inner circumferential region.

The microcomputer then tries to read an RF signal at the first reference position for the correction to determine if or not the RF signal is obtained (step S32). If the RF signal cannot be obtained, it is understood that the reference position for the correction exists in an information-nonrecorded region on the disk. Thus, the microcomputer 12 uses the amplitude of an LPP signal to decide an optimum tilt-correcting amount. Specifically, as the radial tilt amount is altered little by little at the reference position for the correction to detect the LPP signal amplitudes, and a tilt-correcting amount showing a maximum of the detected LPP signal amplitudes is decided (step S33).

The microcomputer 12 then adds the offset ΔTilt obtained in the foregoing offset measurement processing, to the tilt-correcting amount obtained at step S33 (step S34). This addition produces a tilt amount identical to a tilt amount that maximizes the amplitude of an RF signal, thus serving as an optimum tilt-correcting amount.

On the other hand, in cases where it is found at step S32 that an RF signal can be acquired, a tilt-correcting amount is altered every predetermined amount at the reference position for the correction, so that a particular tilt-correcting amount maximizing the RF signal amplitude can be decided, the particular tilt-correcting amount functioning as an optimum tilt-correcting amount (step S37).

The microcomputer 12 stores the optimum tilt-correcting amount obtained at either step S34 or S37, into the correcting profile memory (step S35). Then, the microcomputer 12 moves to the determination whether or not the above processing has been competed at all the reference positions for the correction (step S36). If this determination shows the incompletion, the processing is made to shift to step S31 for the next reference position for the correction. This repetition allows all of the predetermined reference positions to be subjected to the decision of optimum tilt-correcting amounts, thus the correction profile being completed and its production processing being ended. The processing is then retuned to the main routine shown in FIG. 11.

Figure 14:
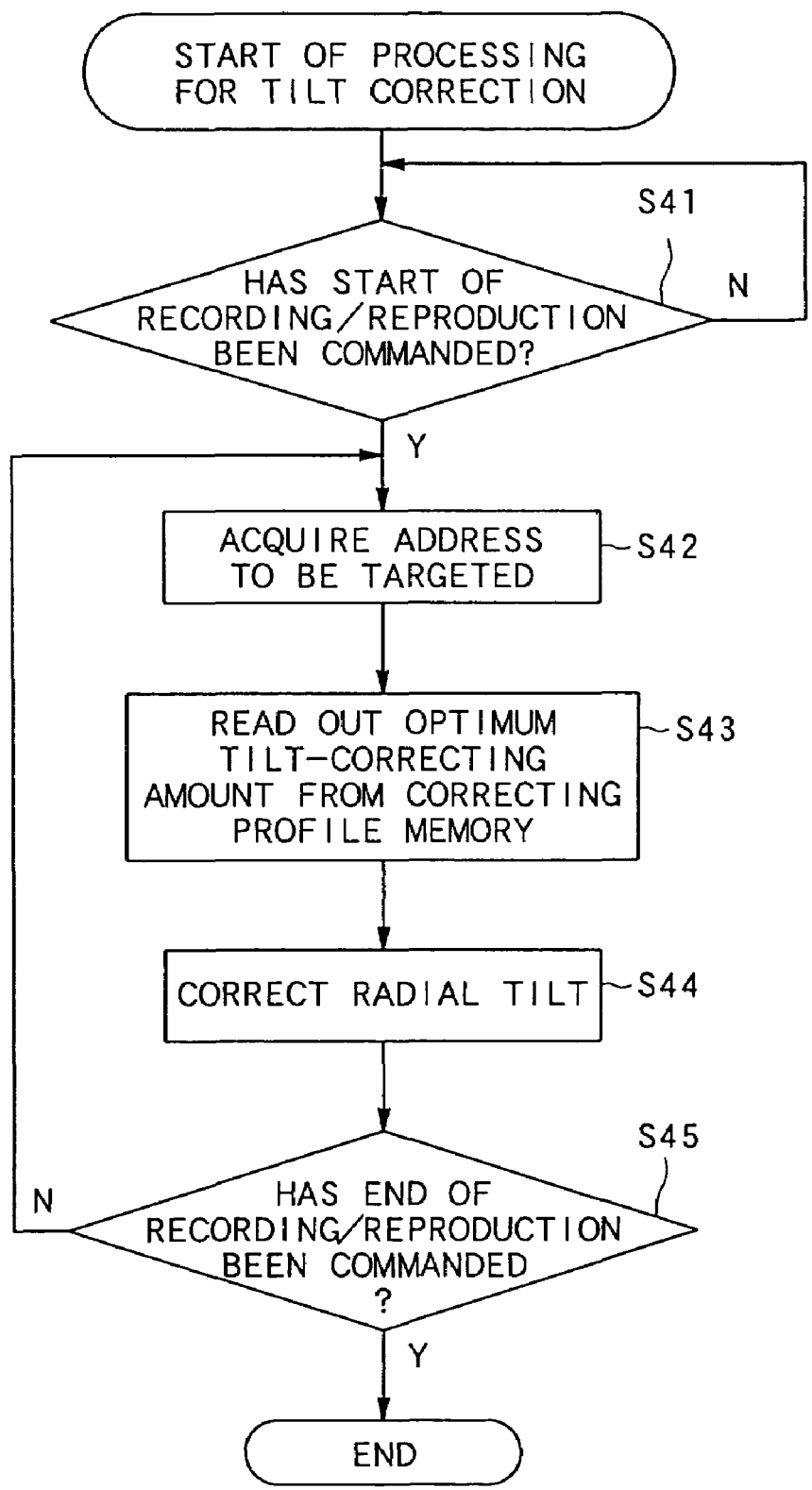
FIG. 14 is a flowchart exemplifying processing for correcting radial tilts.

When the correction profile is completed, the microcomputer 12 is allowed to move to a recording or reproducing operation carried out under the correction of the radial tilt (step S4 in FIG. 11). This radial tilt correction carried out in parallel to the recording or reproducing operation is shown in FIG. 14. The microcomputer 12 achieves this radial tilt correction by controlling the tilt corrector 2a through the tilt-correcting driver 13.

When starting the processing shown in FIG. 14, the microcomputer 12 first determines if or not a user has commanded recording bits of information onto the disk 1 or reproduction of bits of information from the disk 1 (step S41). When it is determined that the recording or reproduction has been commanded, the microcomputer 12 utilizes an LPP signal or others to acquire an address to be targeted for the recording or reproduction (step S42), then acquires from the correcting profile memory 12a an optimum tilt-correcting amount corresponding to the acquired address (step S43). Further, the microcomputer 12 drives the tilt-correcting driver 13 on the basis of the acquired optimum tilt-correcting amount (step S44). The above processing at steps S42 to S44 is performed during the recording or reproducing operation.

Further, the microcomputer 12 determines whether or not the user has commanded the end of the recording or reproducing operation (step S45). Until the issuance of this end command, the processing lasts by repeating steps S42 to S44. When receiving the end command, the microcomputer 12 will terminate the processing.

As described so far, in the present example, at the boundary between an information-recorded area and an information-nonrecorded area on a disk to be recorded or reproduced, a first tilt amount maximizing the RF signal amplitude and a second tilt amount maximizing the LPP signal amplitude are obtained. The first and second tilt amounts are used to figure out an offset ΔTilt. Then, at each correcting reference position on the disk, an optimum tilt amount is decided on the basis of either an RF signal if the disk has already been recorded with bits of information or a combination of an LPP signal and the offset ΔTilt if the disk is yet to be recorded with bits of information, the decided optimum tilt amounts being memorized to form a correction profile. During a recording or reproducing operation of this disk, the correction profile is subjected to inquiries to conduct the radial tilt correction.

As a result, since the radial tilt is corrected with the use of the correction profile produced disk by disk, the radial tilt correction becomes more accurate independently of types of disks. In addition, the information recording/reproducing system itself, which is in charge of recording or reproducing bits of information, is able to decide optimum tilt-correcting amounts to produce a correction profile. Hence, even if there are irregularities in the characteristics of the pickup, optical systems, and/or others in the information recording/reproducing system, the optimum tilt-correcting amounts can be decided with consideration of such characteristics, thus raising accuracy of the radial tilt correction. Moreover, whenever a disk undergoes actual reproducing and reproduction of bits of information, the correction profile is always produced prior to the recording and reproduction. This has less influence on the radial tilt correction, even if there are fluctuations in the recording or reproduction characteristics due to aging at the optical systems and/or due to changes in the temperature during the recording/reproduction operation.

(How to Shorten Time for Producing Correction Profile)

As explained above, the present embodiment adopts the technique of producing a correction profile prior to actual recording or reproduction of information. Thus, if it takes a long time to produce the correction profile, a user who loads a disk into the information recording/reproducing system should wait for a long time until the recording or reproduction begins. It is therefore desired that the production of the correction profile be completed within as a shorter time as possible. In the following, there are provided two techniques to shorten the time for producing the correction profile.

A first technique is concerned with rotation control of a disk during the production of a correction profile. As shown in FIG. 13, for producing a correction profile, a light beam is moved to a predetermined reference position for the correction, where an LPP signal is detected as a tilt-correcting amount is changed little by little, thereby a tilt-correcting amount maximizing the LPP signal amplitude being decided. That is, the light beam is moved in turn to plural positions aligning in the radial direction on the disk, so that a tilt-correcting amount is decided at each redial position.

However, the CLV control requires that a rotation velocity of the disk differs depending on each radial position on the disk. There is therefore the necessity of controlling the rotation velocity of the spindle motor into different velocities every time when the correcting reference positions are changed. In addition, it takes a certain period of time to make the rotation velocity of the spindle motor stabilized, thus leading to an excessively elongated time for producing a correction file.

In consideration of this drawback, during the production of a correction profile, the disk is rotated under CAV (Constant Angular Velocity) control. This eliminates the need for changing the rotation velocity of the spindle motor, thus shortening the time required for controlling the rotation velocity of the disk. Incidentally, though there is the fact that data itself is recorded on the disk under the CLV control, the data can be read out under the CAV control. That is, as long as the frequency characteristics of both the RF signal producer 4 and LPP signal producer 3 are kept flat to some extent, the amplitudes of the RF and LPP signals to be read out will not fluctuate, though their time spans are changed. Thus, in cases where the RF and LPP signals are subjected to amplitude reading on the CAV control during the production of a correction profile, there occurs no problem.

Additionally, in the case that a correction profile is produced on the CAV control, it is sufficient if the information recording/reproducing system has the capability of simply rotating a disk on the CAV control; i.e., it is not always necessary to give the information recording/reproducing system itself the capability of acquiring address information and others according to the CAV control.

A second technique concerns a reduction in the number of points to be measured. In the foregoing production of a correction profile, it is necessary to make tilt-correcting amounts fluctuate so that LPP signal amplitudes are measured to decide an optimum tilt-correcting amount (step S33 in FIG. 13). In this processing, the number of measurement points can be lessened as follows.

As understood from FIGS. 7A to 7C and 10A to 10C, the relationship between the tilt-correcting amount and the LPP signal amplitude can be approximated to a quadratic function (parabolic curve). Thus, measuring the amplitudes of LPP signals at three points at a minimum (i.e., different tilt-correcting amounts) makes it possible that a function indicative of the tilt-correcting amounts and the LPP signal amplitudes is decided based on the measurement points using an approximation technique, and then a tilt-correcting amount showing a peak amount of the LPP signal amplitudes is assigned to a tilt-correcting amount to maximize the LPP signal amplitudes. This reduces the number of measurement points for measuring the LPP signal amplitudes, whereby the production of a correction profile can be speeded up.

Either of the first or second technique may be applied to the foregoing embodiment, while both the first and second techniques may be adopted together in the foregoing embodiment.

(Modifications)

The foregoing embodiment has provided the configuration in which the LPPs (refer to FIG. 1) formed on the land existing on the radially outer side of a particular groove (in addition, adjacently thereto) undergo the detection of amplitude of an LPP signal. Alternatively, the LPPs formed on the land existing on the radially inner side of a particular groove may undergo the detection of amplitude of an LPP signal. The correlation between the detected LPP signal from the radially inner-side land and an RF signal from the groove may be used in the same way as the above. Moreover, the amplitudes of LPP signals from both lands existing on both radially inner and outer sides of a particular groove may also be utilized together.

Still, in the foregoing embodiment, the bottom hold circuit 11 has been used to detect the amplitude levels of the LPP signal. In this case, the quadrant photo detector PD shown in FIG. 1 is obliged to detect amplitude levels of a signal from the LPPs existing on the radially outer side of a recording track Gr. This bottom hold circuit 11 may be replaced by a peak hold circuit, so that amplitude levels of a signal from the LPPs existing on the radially inner side of a recording track Gr may be detected for use in deciding a tilt-correcting amount. Another alternative is that both the peak hold circuit and the bottom hold circuits are placed to detect amplitude levels of a signal from the LPPs existing on the radially inner and outer sides of a recording track Gr.

Still, there can be provided a modification about when the foregoing processing should be carried out. In the foregoing embodiment, both the offset measurement and the correction profile production are designed to be performed immediately after a disk is loaded into the information recording/reproducing system. Alternatively, various other timings other than the above, such as a period of time waiting for the next recording operation may be used for performing the offset measurement and the correction profile production.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

The entire disclosure of Japanese Patent Application No. 2002-253589 filed on Aug. 30, 2002 including the specification, claims, drawings and summary is incorporated herein by reference in its entirety.

What is claimed is:

1. A tilt correcting apparatus for correcting a tilt amount of a light beam to be radiated from a pickup to a disk, the apparatus comprising:

a pre-pit signal producer configured to produce a pre-pit signal indicative of an existence/nonexistence of a pre-pit formed on the disk on the basis of returned light of the light beam radiated onto the disk;

an RF signal producer configured to produced an RF signal from bits of information recorded on the disk on the basis of the returned light;

a correcting-amount deciding unit configured to decide an optimum tilt-correcting amount by measuring an offset amount on the basis of a relationship between the pre-pit signal and the RF signal and making use of the measured offset amount; and a tilt corrector configured to correct the tilt amount on the basis of the optimum tilt-correcting amount, wherein the correcting-amount deciding unit comprises:

a first detecting device configured to detect a first tilt amount providing an amount of the tilt maximizing the amplitude of the RE signal;

a second detecting device configured to detect a second tilt amount providing an amount of the tilt maximizing an amplitude of the pre-pit signal;

a calculating device configured to calculate an offset tilt amount indicative of a difference between the first and second tilt amounts; and a deciding device configured to decide the optimum tilt-correcting amount using the offset tilt amount.

2. The tilt correcting apparatus according to claim 1, wherein the correcting-amount deciding unit further comprises boundary detecting device configured to detect a boundary existing between an information-recorded region and an information-non recorded region on the disk, wherein the first detecting device is configured to detect the first tilt amount in the information-recorded region near the boundary, and the second detecting device is configured to detect the second tilt amount in the information-non recorded region near the boundary.

3. The tilt correcting apparatus according to claim 1, wherein the correcting-amount deciding unit is configured to decide the optimum tilt-correcting amount on the basis of the RE signal when the tilt amount in the information-recorded region on the disk is corrected and to decide the optimum tilt-correcting amount on the basis of the LPP signal and the offset tilt amount when the tilt amount in the information-non recorded region on the disk is corrected.

4. The tilt correcting apparatus according to claim 1, wherein the correcting-amount deciding unit is configured to decide, as the optimum tilt-correcting amount, a tilt-correcting amount corresponding to the first tilt amount when the tilt amount in the information-recorded region on the disk is corrected and to decide, as the optimum tilt-correcting amount, a tilt-correcting amount corresponding to a sum of the second tilt amount and the offset tilt amount.

5. The tilt correcting apparatus according to claim 1, wherein the correcting-amount deciding unit further comprises a correction profile producing device configured to allow the optimum tilt-correcting amount to be obtained at each correcting reference position determined previously on the disk and configured to produce a correction profile consisting of the optimum tilt-correcting amount at each correcting reference position; and wherein the tilt corrector is configured to correct the tilt amount on the basis of the correction profile.

6. The tilt correcting apparatus according to claim 5, further comprising a disk rotation controller configured to make the disk rotate, the disk rotation controller configured to make the disk rotate at a constant angular velocity in cases where the correcting-amount deciding unit obtains the optimum tilt-correcting amount at each correcting reference position.

7. The tilt correcting apparatus according to claim 1, further comprising a memory configured to memorize the optimum tilt-correcting amount obtained at each of a plurality of radial positions of the disk.

8. A tilt correcting method of correcting a tilt amount of a light beam to be radiated from a pickup to a disk, the method comprising the steps of:

producing a pre-pit signal indicative of an existence/nonexistence of a pre-pit formed on the disk on the basis of returned light of the light beam radiated onto the disk;

producing an RE signal from bits of information recorded on the disk on the basis of the returned light;

deciding an optimum tilt-correcting amount by measuring an offset amount on the basis of a relationship between the pre-pit signal and the RE signal and making use of the measured offset amount; and correcting the tilt amount on the basis of the optimum tilt-correcting amount, wherein the step of correcting the tilt amount includes the steps of:

detecting a first tilt amount providing an amount of the tilt maximizing the amplitude of the RE signal;

detecting a second tilt amount providing an amount of the tilt maximizing an amplitude of the pre-pit signal;

calculating an offset tilt amount indicative of a difference between the first and second tilt amounts; and deciding the optimum tilt-correcting amount using the offset tilt amount.

* * * * *